United States Patent
Lee et al.

(10) Patent No.: US 8,526,063 B2
(45) Date of Patent: Sep. 3, 2013

(54) IMAGE FORMING APPARATUS, METHOD, AND SYSTEM FOR ENCRYPTING OR DECRYPTING PORTION OF IMAGE

(75) Inventors: Hae-Kee Lee, Suwon-si (KR); Ho-Keun Lee, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 356 days.

(21) Appl. No.: 12/805,370

(22) Filed: Jul. 27, 2010

(65) Prior Publication Data
US 2011/0058225 A1 Mar. 10, 2011

(30) Foreign Application Priority Data
Sep. 9, 2009 (KR) .............................. 2009-0084936

(51) Int. Cl.
| | | |
|---|---|---|
| H04N 1/40 | (2006.01) |
| G06F 3/12 | (2006.01) |
| G06K 15/02 | (2006.01) |
| G06K 19/06 | (2006.01) |
| B41M 3/14 | (2006.01) |
| H04N 1/32 | (2006.01) |
| G06F 21/60 | (2013.01) |
| G06F 3/048 | (2013.01) |

(52) U.S. Cl.
CPC .......... H04N 1/32272 (2013.01); G06F 21/608 (2013.01); G06F 3/048 (2013.01); G06K 19/06028 (2013.01); G06K 19/06037 (2013.01); Y10S 283/902 (2013.01)
USPC ........... 358/3.28; 358/1.14; 380/55; 235/494; 283/73; 283/902

(58) Field of Classification Search
USPC ............... 358/3.28, 1.14, 526, 470; 382/100; 380/55; 235/487, 494; 283/73, 113, 114, 283/902; 713/189; 399/366
See application file for complete search history.

(56) References Cited

U.S. PATENT DOCUMENTS

| | | | | | |
|---|---|---|---|---|---|
| 5,444,779 | A | * | 8/1995 | Daniele | 399/366 |
| 5,512,977 | A | * | 4/1996 | Imai | 399/366 |
| 5,901,224 | A | * | 5/1999 | Hecht | 283/113 |
| 6,175,714 | B1 | * | 1/2001 | Crean | 399/366 |
| 6,694,043 | B2 | * | 2/2004 | Seder et al. | 382/100 |
| 6,970,259 | B1 | * | 11/2005 | Lunt et al. | 358/1.14 |
| 7,227,661 | B2 | * | 6/2007 | Matsunoshita | 358/1.14 |
| 7,653,814 | B2 | * | 1/2010 | Carro | 713/176 |
| 7,684,089 | B2 | * | 3/2010 | Yamada | 358/3.28 |
| 8,181,261 | B2 | * | 5/2012 | Sperry | 399/366 |
| 8,274,709 | B2 | * | 9/2012 | Kakutani | 358/3.28 |
| 2005/0036654 | A1 | * | 2/2005 | Wan | 382/100 |
| 2008/0018942 | A1 | * | 1/2008 | Komiya | 358/3.28 |
| 2010/0046753 | A1 | * | 2/2010 | Inami et al. | 380/55 |
| 2010/0074437 | A1 | * | 3/2010 | Inami et al. | 382/100 |
| 2010/0091337 | A1 | * | 4/2010 | Yoshio et al. | 358/3.28 |

FOREIGN PATENT DOCUMENTS

JP 2008-061027 3/2008

* cited by examiner

*Primary Examiner* — Scott A Rogers
(74) *Attorney, Agent, or Firm* — Staas & Halsey LLP

(57) ABSTRACT

An image forming apparatus is described. The image forming apparatus includes a pattern detection unit to detect whether an input image includes a specific pattern as a portion of the image, a conversion unit to convert the specific pattern into data in a predetermined format, an encryption unit to encrypt the data in the predetermined format and to generate an encryption pattern from the encrypted data, and an output unit to output an image that is similar to the input image except for the portion of the image, which includes the encryption pattern rather than the specific pattern in the output image.

31 Claims, 5 Drawing Sheets

IMAGE FORMING APPARATUS, METHOD, AND SYSTEM FOR ENCRYPTING OR DECRYPTING PORTION OF IMAGE

CROSS-REFERENCE TO RELATED APPLICATIONS

This application claims the benefit of Korean Patent Application No. 2009-84936, filed in the Korean Intellectual Property Office on Sep. 9, 2009, the disclosure of which is incorporated herein by reference.

BACKGROUND

1. Field

Aspects of the present disclosure relate to an image forming apparatus, an image processing method thereof, and an image forming system, and more particularly, to an image forming apparatus capable of preventing unauthorized copying, an image processing method thereof, and an image forming system.

2. Description of the Related Art

An image forming apparatus is configured to generate, print, receive, and transmit image data, and may include, for example, a printer, a scanner, a copy machine, a fax machine, and a multi-functional peripheral (MFP) combining these.

An image forming apparatus such as a copy machine is generally used to copy and output a plurality of documents or pictures. Recently, the general quality of copied documents has improved thanks to significant efforts made towards that goal.

However, with the improvements in copy technology, illegal copying, such as copying to create counterfeit money using a high-definition copy machine, has become prevalent. To prevent such illegal copying, a conventional copy machine is configured not to copy a document containing a specific word or phrase.

However, there are occasions in which an entire document should be copied even if the document contains a specific word or phrase, or there are occasions in which only a document that excludes a specific word or phrase should be copied.

SUMMARY

An aspect of the present disclosure relates to an image forming apparatus, in which a specific pattern is detected from an image to output the image after encrypting the specific pattern, an image processing method thereof, and an image forming system.

Another aspect of the present disclosure relates to an image forming apparatus to decrypt an image having an encryption pattern, an image processing method, and an image forming system.

According to an aspect of the present disclosure, there is provided an image processing method, for example, of an image forming apparatus. The image processing method includes detecting whether an input image includes a specific pattern as a portion of the image, converting the specific pattern into an encrypted format having a second specific pattern and substituting the second specific pattern for the specific pattern in an output image, and outputting the output image.

According to another aspect of the present disclosure, the specific pattern may include at least one of numbers, letters, symbols, and figures.

According to another aspect of the present disclosure, the specific pattern may be received from at least one of a user interface (UI) screen provided on a portion of the image forming apparatus, an external apparatus being connected to the image forming apparatus, and a host apparatus being connected to the image forming apparatus.

According to another aspect of the present disclosure, the second specific pattern may include at least one of a one dimensional bar code, a two dimensional bar code, and a form of mapping the specific pattern with at least one color.

According to another aspect of the present disclosure, the output image is similar to the input image except that the second specific pattern of the output image is substituted for the specific pattern of the input image.

According to another aspect of the present disclosure, the specific pattern is only converted into the encrypted format when it is detected that the input image includes the specific pattern.

According to another aspect of the present disclosure, there is provided an image forming apparatus including a pattern detection unit to detect whether an input image includes a specific pattern as a portion of the image, an encryption unit to convert the specific pattern into an encrypted format having a second specific pattern, and an output unit to output an output image that substitutes the second specific pattern for the specific pattern.

According to another aspect of the present disclosure, the specific pattern comprises at least one of numbers, letters, symbols, and figures.

According to another aspect of the present disclosure, the specific pattern is received from at least one of a user interface (UI) screen provided on a portion of the image forming apparatus, an external apparatus being connected to the image forming apparatus, and a host apparatus being connected to the image forming apparatus.

According to another aspect of the present disclosure, the second specific pattern comprises at least one of a one dimensional bar code, a two dimensional bar code, and a form of mapping a pattern using at least one color.

According to another aspect of the present disclosure, the output image is similar to the input image except that the second specific pattern of the output image is substituted for the specific pattern of the input image.

According to another aspect of the present disclosure, the specific pattern is only converted into the encrypted format when it is detected that the input image includes the specific pattern.

According to another aspect of the present disclosure, an image processing method of an image forming apparatus is provided. The image processing method includes detecting whether an input image includes a specific pattern as a portion of the image, converting the specific pattern into data in a predetermined format, encrypting the data in the predetermined format and generating an encryption pattern from the encrypted data, and outputting an output image that is similar to the input image except for the portion of the image, which includes the encryption pattern rather than the specific pattern in the output image.

According to another aspect of the present disclosure, the specific pattern comprises at least one of numbers, letters, symbols, and figures.

According to another aspect of the present disclosure, the predetermined format comprises at least one of a one dimensional bar code, a two dimensional bar code, and a form of mapping a pattern using at least one color.

According to another aspect of the present disclosure, the specific pattern is only converted into the encrypted format when it is detected that the input image includes the specific pattern.

According to another aspect of the present disclosure, when it is detected that the input image does not include the specific pattern, the image is output without change.

According to another aspect of the present disclosure, the image forming apparatus outputs the output image.

According to another aspect of the present disclosure, there is provided an image forming apparatus including a pattern detection unit to detect whether an input image includes a specific pattern as a portion of the image, a conversion unit to convert the specific pattern into data in a predetermined format, an encryption unit to encrypt the data in the predetermined format and to generate an encryption pattern from the encrypted data, and an output unit to output an image that is similar to the input image except for the portion of the image, which includes the encryption pattern rather than the specific pattern in the output image.

According to another aspect of the present disclosure, the specific pattern comprises at least one of numbers, letters, symbols, and figures.

According to another aspect of the present disclosure, the predetermined format comprises at least one of a one dimensional bar code, a two dimensional bar code, and a form of mapping a pattern using at least one color.

According to another aspect of the present disclosure, the specific pattern is only converted into the encrypted format when it is detected that the input image includes the specific pattern.

According to another aspect of the present disclosure, when the pattern detecting unit detects that the input image does not include the specific pattern, the output unit outputs the input image without change.

According to another aspect of the present disclosure, an image processing method of an image forming apparatus is provided. The image processing method includes detecting whether an input image includes an encryption pattern as a portion of the input image, decrypting the encryption pattern and generating a decryption pattern from the decrypted encryption pattern, when it is detected that the input image includes the encryption pattern, and outputting, using the image forming apparatus, an output image that is similar to the input image except for the portion of the image, which includes the decryption pattern rather than the encryption pattern in the output image.

According to another aspect of the present disclosure, there is provided an image forming apparatus including a pattern detection unit to detect whether an input image includes an encryption pattern as a portion of the input image, a decryption unit to decrypt the encryption pattern and to generate a decryption pattern from the decrypted encryption pattern, when it is detected that the input image includes the encryption pattern, and an output unit to output an image that is similar to the input image except for the portion of the image, which includes the decryption pattern rather than the encryption pattern in the output image.

Additional aspects and/or advantages of the present disclosure will be set forth in part in the description which follows and, in part, will be obvious from the description, or may be learned by practice of the embodiments.

BRIEF DESCRIPTION OF THE DRAWINGS

These and/or other aspects and advantages of the present disclosure will become apparent and more readily appreciated from the following description of the embodiments, taken in conjunction with the accompanying drawings, of which.

DETAILED DESCRIPTION

Figure 1:
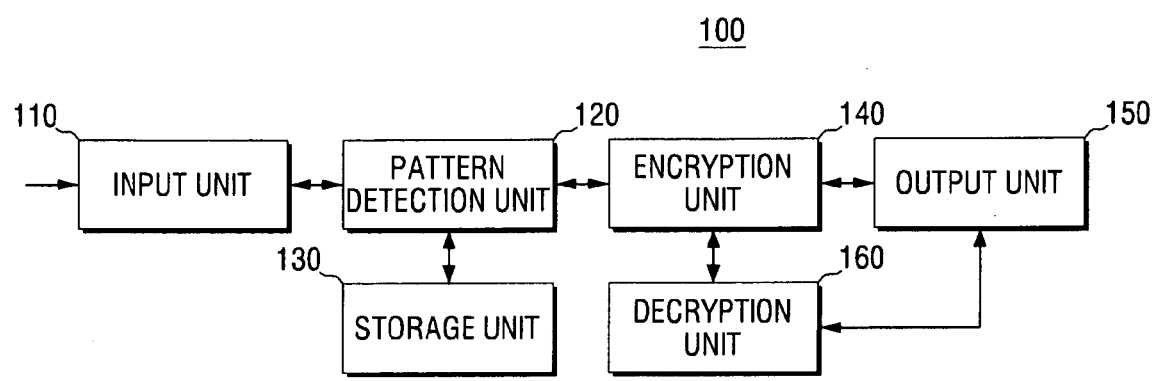
FIG. 1 is a block diagram of an image forming apparatus according to an exemplary embodiment of the present disclosure.

Reference will now be made in detail to exemplary embodiments of the present disclosure, examples of which are illustrated in the accompanying drawings, wherein like reference numerals refer to like elements throughout. Embodiments are described below, in order to explain the present disclosure by referring to the figures.

FIG. 1 is a block diagram of an image forming apparatus according to an exemplary embodiment of the present disclosure. Referring to FIG. 1, the image forming apparatus 100 may include, for example, an input unit 110, a pattern detection unit 120, a storage unit 130, an encryption unit 140, an output unit 150, and a decryption unit 160.

The input unit 110 receives a scanned image, e.g., as an input image.

The pattern detection unit 120 detects whether or not the input image contains a specific pattern. The specific pattern may include, for example, at least one of numbers, letters, symbols, and figures, any or all of which a user may not want to copy. For example, the specific pattern may be a phone number, a registration number, a corporate name, an emoticon, a logogram, or any combination of these.

The specific pattern may be received from any one or more of a user interface (UI) screen provided on a portion of the image forming apparatus 100, an external apparatus such as a universal serial bus (USB) memory that is connected to the image forming apparatus 100, and a host apparatus that is connected to the image forming apparatus 100 directly or over a network. The image forming apparatus 100 may further include an interface (not shown) configured to interface with the external apparatus or the host apparatus.

The storage unit 130 stores a specific pattern, which is received from a UI screen, an external apparatus, a host apparatus, and so on. If a new specific pattern is updated, the storage unit 130 may store the updated new pattern.

The pattern detection unit 120 converts letters or numbers included in an input image into a text format using an optical character recognition (OCR) program. Subsequently, the pattern detection unit 120 sequentially compares letters or numbers that have been converted into text format with a specific pattern pre-stored in the storage unit 130 to detect a specific pattern that a user does not want to copy.

If the pattern detection unit 120 does not detect a specific pattern from an input image, the output unit 150 may output the input image as is. The pattern detection unit 120 may use a variety of known techniques, in addition to the OCR program, to detect a specific pattern.

The encryption unit 140 may convert a specific pattern into a predetermined format, encrypt the converted pattern, and generate an encryption pattern, if the pattern detection unit 120 detects the specific pattern from the input image. The predetermined format may be a one dimensional bar code, or a two dimensional bar code such as a data matrix, PDF 417, or a quick response (QR) code. Alternatively, the specific pattern may be encrypted to be in a predetermined format using a specific color among any of C, M, Y, or K (cyan, magenta, yellow, or black). For example, numbers or letters included in a specific pattern are mapped with a specific color so that the specific pattern is encrypted. In more detail, the number '1' may be represented as colors C and Y in series, and the number '2' may be represented as colors C and M in series so that specific patterns are mapped and encrypted.

Numbers may be printed with light yellow in a small amount of toner so as to make it difficult for a human to perceive. Alternatively, a correlation mark may be printed instead of a specific phrase, and then the correlation mark may be decrypted using a film filter such as a decoder.

The encryption unit 140 may encrypt a specific pattern to be decrypted only when a predetermined condition, for example, the identification of a predetermined user, is satisfied. That is, the specific pattern is not encrypted in a general format that may be decrypted by anyone.

The output unit 150 outputs an image including an encryption pattern. The output unit 150 may output an image having an encryption pattern on a UI screen provided on a portion of the image forming apparatus 100. In this situation, the output unit 150 may print an image having an encryption pattern on a printing medium of the image forming apparatus 100.

The output unit 150 may output an image including a decryption pattern in which an encryption pattern is decrypted. Specifically, the output unit 150 may output an image having a decryption pattern on a UI screen of the image forming apparatus 100 or a host apparatus or on a printing medium of the image forming apparatus 100. Accordingly, if a user loses an original image, a copy image that has been encrypted and output could be decrypted back into its original state.

The decryption unit 160 detects an encryption pattern and decrypts the detected pattern. Information used when the encryption unit 140 performs encryption is pre-stored in the storage unit 130, and thus the decryption unit 160 may use the information when performing decryption.

The decryption unit 160 may generate a decryption pattern after going through a user authentication process, and the decryption pattern is an original specific pattern prior to the encryption. Only a predetermined user can decrypt a specific pattern by inputting a registration number, a predefined password, a defining characteristic such as a fingerprint or retina scan, or a name on the UI screen of the image forming apparatus 100 or a host apparatus.

The decryption unit 160 may have the same configuration as the encryption unit 150, or may be configured separately from the encryption unit 150 as shown in FIG. 1.

The image forming apparatus 100 may further include a UI screen (not shown) to receive a user's response to indicate whether or not to convert and encrypt a specific pattern if the pattern detection unit 120 detects the specific pattern.

The image forming apparatus 100 according to the exemplary embodiment of the present disclosure may be a multifunctional peripheral (MFP) having a scanning function, or a copy machine.

In this exemplary embodiment of the present disclosure, an image having a specific pattern is encrypted and output. Furthermore, if an original image is lost, the original image may be restored by decrypting an encrypted image.

Figure 2:
FIG. 2 includes views of the process of encrypting a specific pattern according to an exemplary embodiment of the present disclosure.

FIG. 2 illustrates views of the process of encrypting a specific pattern according to an exemplary embodiment of the present disclosure. Referring to FIG. 2, a scanned image to be input to the input unit 110 of the image forming apparatus 100 may contain a resident registration number 200 as shown in an upper view of FIG. 2. If the resident registration number 200 is registered as a specific pattern, the pattern detection unit 120 detects whether the resident registration number 200 is included in an input image. Then, the encryption unit 140 encrypts the detected specific pattern, that is, the resident registration number 200, in a bar code format 210 as shown in a lower view of FIG. 2, and the output unit 150 outputs the image having the encrypted resident registration number. The pattern detection unit 120 may directly detect a resident registration number, and may also detect 6 or 7 successive digits similar to a resident registration number, as a specific pattern.

Figure 3:
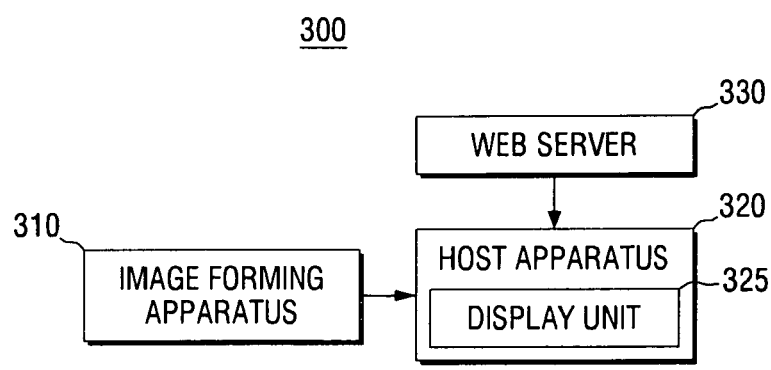
FIG. 3 is a block diagram of an image forming system according to an exemplary embodiment of the present disclosure.

FIG. 3 is a block diagram of an image forming system according to an exemplary embodiment of the present disclosure. Referring to FIG. 3, the image forming system 300 may include, for example, an image forming apparatus 310, a host apparatus 320, and a web server 330.

The image forming apparatus 310 scans a medium bearing an image, and transfers the scanned image to the host apparatus 320. The image forming apparatus 310 may be a multifunctional peripheral (MFP) having a scanning unit (not shown) to scan a printing medium and an output unit (not shown) to output the scanned printing medium. The image forming apparatus 310 may include a network interface (not shown) to communicate with the host apparatus 230, either by wire or wirelessly.

If an image transferred from the image forming apparatus 310 is detected to contain a specific pattern, the host apparatus 320 generates an encryption pattern in which the detected specific pattern has been encrypted and a decryption pattern in which the encryption pattern has been decrypted, and outputs one of an image having the encryption pattern and an image having the decryption pattern to a display unit 325. In this exemplary embodiment of the present disclosure, the display unit 325 may be implemented using a monitor. The host apparatus 320 may also include a network interface (not shown) to communicate with the image forming apparatus 310.

Accordingly, a user may preview an image in which a specific pattern has been encrypted through the display unit 325 of the host apparatus 320 prior to outputting the image.

If a preset event occurs, that is, if a user inputs a printing command to the image forming apparatus 310 by selecting a print button on the host apparatus 320, the image forming apparatus 310 may output an image having an encryption pattern on a printing medium.

If the image having the encryption pattern is scanned by the image forming apparatus 310 and thus the scanned image is input to the image forming apparatus 310, the scanned image is transferred to the host apparatus 320. The host apparatus 320 may convert the encryption pattern into an original pattern which is unencrypted by decrypting the encryption pattern included in the image. When the host apparatus 320 performs encryption, information required to perform decryption of the encrypted information may be pre-stored in the storage unit (not shown).

The host apparatus 320 may perform decryption after going through user authentication. Accordingly, only an authorized user may decrypt an image having an encryption pattern.

The host apparatus 320 may output an image having a decryption pattern to the display unit 325, and may output the image having the decryption pattern directly onto a printing medium, according to the occurrence of a predetermined event.

In another embodiment, the host apparatus 320 may encrypt a detected specific pattern in a hyperlink format, and display the encrypted specific pattern on the display unit 325.

The host apparatus 320 may encrypt a specific pattern in a hyperlink format using the address of a specific web site, instead of a bar code format 210 as shown in a lower view of FIG. 2.

For example, a specific pattern may be encrypted and displayed on the display unit 325 in a form of "www.samsung_encryption.com." In this situation, not only the above address of a specific web site is displayed using an OCR program, but also an entire document that has been converted into a text format, may be displayed on the display unit 325.

The web server 330, which provides information regarding a specific site and is connected to the host apparatus 320 via network, receives a document having an encryption pattern from the host apparatus 320 and stores the document. In addition, the web server 330 may also store an original pattern of the document.

If an address of the specific web site is selected, a user may recognize information regarding the specific pattern prior to the encryption after going through user authentication. By doing so, the host apparatus 320 may decrypt an encryption pattern using information provided by the web server 330, and display a document having a decryption pattern on the display unit 325.

The repetition explanation will be omitted for convenience of description.

Figure 4:
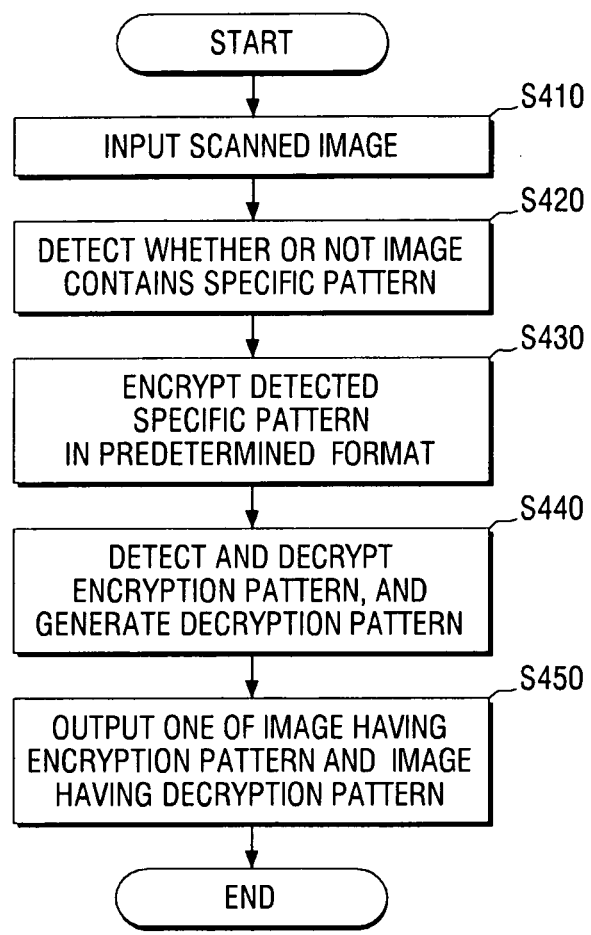
FIGS. 4 and 5 are flowcharts of a process for processing an image on an image forming apparatus according to an exemplary embodiment of the present disclosure.

FIG. 4 is a flowchart of a process for processing an image on an image forming apparatus according to an exemplary embodiment of the present disclosure.

In the image processing method according to an exemplary embodiment of the present disclosure, the input unit 110 receives a scanned image in operation S410, and the pattern detection unit 120 detects whether or not the input image contains a specific pattern in operation S420.

If a specific pattern is detected to be contained in the input image, the decryption unit 140 encrypts the detected specific pattern in a predetermined format, and generates an encryption pattern in operation S430.

The decryption unit 160 detects an encryption pattern, decrypts the detected encryption pattern, and generates a decryption pattern in operation S440.

The output unit 150 outputs one of an image having the encryption pattern and an image having the decryption pattern in operation S450.

According to the exemplary embodiment of the present disclosure shown in FIG. 4, a specific pattern may be encrypted and thus an image having an encryption pattern may be output. Alternatively, the exemplary embodiment of the present disclosure in FIG. 4 may encrypt a specific pattern, decrypt an encryption pattern, and output a decryption pattern, e.g., upon the occurrence of a predetermined condition such as a user authorization.

Accordingly, a document having encrypted information that a user does not wish to share may be generated, and the encrypted information may be decrypted to have its original specific pattern.

Figure 5:
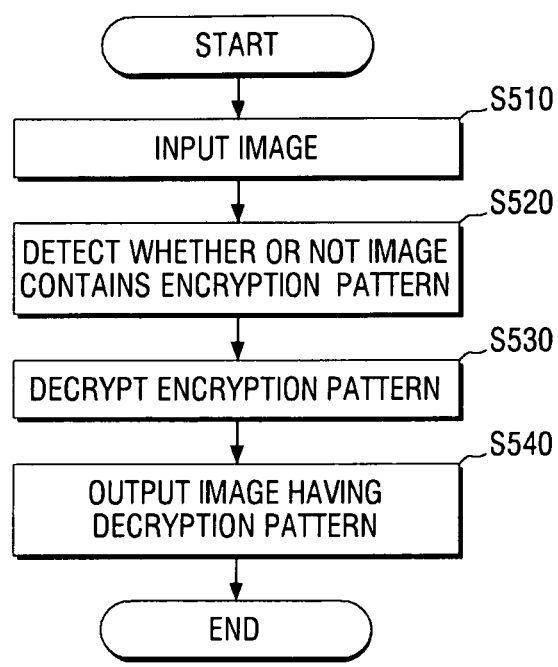

FIG. 5 is a flowchart of a process for processing an image on an image forming apparatus according to another exemplary embodiment of the present disclosure.

FIG. 5 illustrates an image processing method of an image forming apparatus based on a decryption operation. According to the image processing method of the image forming apparatus, the input unit 110 receives a scanned image in operation S510, and the pattern detection unit 120 detects whether or not the input image contains an encryption pattern in operation S520.

If it is detected that an encryption pattern is contained in the input image, the decryption unit 140 decrypts the encryption pattern in a specific pattern prior to the encryption in operation S530.

The output unit 150 outputs an image having the decryption pattern in operation S540.

According to the exemplary embodiment of the present disclosure illustrated in FIG. 5, an image having an encryption pattern which has been encrypted according to a method other than the encryption method illustrated in FIG. 4 may be decrypted.

Any redundant explanation will be omitted for convenience of description.

The image processing method of the image forming apparatus according to an exemplary embodiment of the present disclosure may be implemented using one or more processors to perform each operation or a chip.

In exemplary embodiments of the present disclosure, a computer-readable recording medium supporting a program to execute the image processing method of the image forming apparatus may be provided. The computer-readable recording medium includes all types of recording devices to store data readable by a computer system. The computer-readable recording medium may be a read-only memory (ROM), a read-access memory (RAM), a compact disc-ROM (CD-ROM), a magnetic tape, a floppy disc, or an optical data storage device. The computer-readable recording medium may be dispersed to computer systems that are connected via network, and may store and execute codes that a computer can read in a dispersed manner. Examples of the program include both machine code, such as produced by a compiler, and files containing higher level code that may be executed by the computer using an interpreter. The described hardware devices may be configured to act as one or more software modules in order to perform the operations of the above-described example embodiments, or vice versa. The instructions may be executed on any processor, general purpose computer, or special purpose computer including an image forming apparatus and the software modules may be controlled by any processor.

Although a few embodiments of the present disclosure have been shown and described, it would be appreciated by those skilled in the art that changes may be made in this embodiment without departing from the principles and spirit of the disclosure, the scope of which is defined in the claims and their equivalents.

What is claimed is:

1. An image processing method of an image forming apparatus, the image processing method comprising:
    receiving a scanned image as an input image;
    detecting whether or not the input image includes a specific pattern;
    if it is detected that the input image includes a specific pattern, encrypting the detected specific pattern in a predetermined format, and generating an encryption pattern;
    detecting and decrypting the encryption pattern, and generating a decryption pattern; and
    outputting one of an image including the encryption pattern and an image including the decryption pattern.

2. The image processing method according to claim 1, wherein the specific pattern comprises at least one of numbers, letters, symbols, and figures.

3. The image processing method according to claim 1, wherein the specific pattern is received from at least one of a user interface (UI) screen provided on a portion of the image forming apparatus, an external apparatus being connected to the image forming apparatus, and a host apparatus being connected to the image forming apparatus.

4. The image processing method according to claim 1, wherein the predetermined format comprises at least one of a one dimensional bar code, a two dimensional bar code, and a form of mapping the specific pattern with at least one color.

5. The image processing method according to claim 1, wherein the generating generates the decryption pattern upon a user authentication.

6. An image processing method of an image forming apparatus, the image processing method comprising:
   receiving an image including an encryption pattern as an input image;
   detecting whether or not the input image includes an encryption pattern;
   if it is detected that the input image includes an encryption pattern, decrypting the encryption pattern, and generating a decryption pattern; and
   outputting an image including the decryption pattern.

7. An image forming apparatus, comprising:
   an input unit to receive a scanned image as an input image;
   a detection unit to detect whether or not the input image includes a specific pattern;
   an encryption unit to encrypt a detected specific pattern in a predetermined format, and generate an encryption pattern if it is detected that the input image includes the specific pattern;
   a decryption unit to detect and decrypt the encryption pattern, and to generate a decryption pattern; and
   an output unit to output one of an image including the encryption pattern and an image including the decryption pattern.

8. The image forming apparatus according to claim 7, wherein the specific pattern comprises at least one of numbers, letters, symbols, and figures.

9. The image forming apparatus according to claim 7, wherein the specific pattern is received from at least one of a user interface (UI) screen provided on a portion of the image forming apparatus, an external apparatus being connected to the image forming apparatus, and a host apparatus being connected to the image forming apparatus.

10. The image forming apparatus according to claim 7, wherein the predetermined format comprises at least one of a one dimensional bar code, a two dimensional bar code, and a form of mapping the specific pattern with at least one color.

11. An image forming system comprising a host apparatus comprising a display unit and an image forming apparatus being connected to the host apparatus, the image forming system comprising:
   the image forming apparatus to scan a printing medium bearing an image and to transfer the scanned image to the host apparatus; and
   if it is detected that the transferred image includes a specific pattern, the host apparatus to generate an encryption pattern in which the detected specific pattern is encrypted in a predetermined format, to generate a decryption pattern in which the encryption pattern is decrypted, and to output one of an image including the encryption pattern and an image including the decryption pattern on the display unit.

12. The image forming system according to claim 11, wherein the specific pattern comprises at least one of numbers, letters, symbols, and figures.

13. The image forming system according to claim 11, wherein the specific pattern is received from at least one of a user interface (UI) screen provided on a portion of the image forming apparatus, an external apparatus being connected to the image forming apparatus, and a host apparatus being connected to the image forming apparatus.

14. The image forming system according to claim 11, wherein the predetermined format comprises at least one of a one dimensional bar code, a two dimensional bar code, and a form of mapping the specific pattern with at least one color.

15. The image forming system according to claim 11, wherein if a preset event occurs, the image forming apparatus outputs an image including the encryption pattern on a printing medium.

16. The image forming system according to claim 11, wherein if a preset event occurs, the image forming apparatus outputs an image including the decryption pattern on a printing medium.

17. The image forming system according to claim 11, wherein the host apparatus encrypts the detected specific pattern in a hyperlink format.

18. The image forming system according to claim 17, further comprising:
   a web server to be connected to the host apparatus over network, and to store information regarding the detected specific pattern,
   wherein the host apparatus decrypts an encryption pattern which has been encrypted in the hyperlink format using the information provided by the web server, and displays the decrypted pattern on the display unit.

19. A method of forming an image in an image forming apparatus, the method comprising:
   detecting whether an input image includes a specific pattern as a portion of the image;
   converting the specific pattern into data in a predetermined format;
   encrypting the data in the predetermined format and generating an encryption pattern from the encrypted data; and
   outputting an output image that is similar to the input image except for the portion of the image, which includes the encryption pattern rather than the specific pattern in the output image.

20. The image processing method according to claim 19, wherein the specific pattern comprises at least one of numbers, letters, symbols, and figures.

21. The image processing method according to claim 19, wherein the predetermined format comprises at least one of a one dimensional bar code, a two dimensional bar code, and a form of mapping a pattern using at least one color.

22. The image processing method according to claim 19, wherein the specific pattern is only converted into the encrypted format when it is detected that the input image includes the specific pattern.

23. The image processing method according to claim 19, wherein when it is detected that the input image does not include the specific pattern, the image is output without change.

24. The image processing method according to claim 19, wherein the image forming apparatus outputs the output image.

25. An image forming apparatus comprising:
   a pattern detection unit to detect whether an input image includes a specific pattern as a portion of the image;
   a conversion unit to convert the specific pattern into data in a predetermined format;
   an encryption unit to encrypt the data in the predetermined format and to generate an encryption pattern from the encrypted data; and
   an output unit to output an image that is similar to the input image except for the portion of the image, which includes the encryption pattern rather than the specific pattern in the output image.

26. The image forming apparatus according to claim 25, wherein the specific pattern comprises at least one of numbers, letters, symbols, and figures.

27. The image forming apparatus according to claim 25, wherein the predetermined format comprises at least one of a one dimensional bar code, a two dimensional bar code, and a form of mapping a pattern using at least one color.

28. The image forming apparatus according to claim 25, wherein the specific pattern is only converted into the encrypted format when it is detected that the input image includes the specific pattern.

29. The image forming apparatus according to claim 25, wherein when the pattern detecting unit detects that the input image does not include the specific pattern, the output unit outputs the input image without change.

30. An image processing method of an image forming apparatus, the image processing method comprising:
   detecting whether an input image includes an encryption pattern as a portion of the input image;
   decrypting the encryption pattern and generating a decryption pattern from the decrypted encryption pattern, when it is detected that the input image includes the encryption pattern; and
   outputting, using the image forming apparatus, an output image that is similar to the input image except for the portion of the image, which includes the decryption pattern rather than the encryption pattern in the output image.

31. An image forming apparatus comprising:
   a pattern detection unit to detect whether an input image includes an encryption pattern as a portion of the input image;
   a decryption unit to decrypt the encryption pattern and to generate a decryption pattern from the decrypted encryption pattern, when it is detected that the input image includes the encryption pattern; and
   an output unit to output an image that is similar to the input image except for the portion of the image, which includes the decryption pattern rather than the encryption pattern in the output image.

* * * * *